(12) United States Patent
Mahler et al.

(10) Patent No.: US 10,145,416 B2
(45) Date of Patent: Dec. 4, 2018

(54) BEARING CAGE

(71) Applicant: Schaeffler Technologies AG & Co. KG, Herzogenaurach (DE)

(72) Inventors: Siegfried Mahler, Volkach (DE); Peter Zay, Schwarzach (DE); Hermann Geyer, Vestenbergsgreuth (DE); Jorg Neukirchner, Euerbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/128,698

(22) PCT Filed: Feb. 10, 2015

(86) PCT No.: PCT/DE2015/200072
§ 371 (c)(1),
(2) Date: Sep. 23, 2016

(87) PCT Pub. No.: WO2015/149760
PCT Pub. Date: Oct. 8, 2015

(65) Prior Publication Data
US 2017/0102033 A1  Apr. 13, 2017

(30) Foreign Application Priority Data
Apr. 2, 2014  (DE) .................. 10 2014 206 240

(51) Int. Cl.
*F16C 33/46*  (2006.01)
*F16C 33/38*  (2006.01)
(Continued)

(52) U.S. Cl.
CPC ...... *F16C 33/4676* (2013.01); *F16C 33/3837* (2013.01); *F16C 33/418* (2013.01);
(Continued)

(58) Field of Classification Search
CPC .............. F16C 33/3837; F16C 33/4617; F16C 33/467; F16C 33/4676; F16C 43/065; F16C 43/08; F16C 43/083; F16C 33/418
See application file for complete search history.

(56) References Cited

U.S. PATENT DOCUMENTS 848,776 A * 4/1907 Sisson
1,963,407 A * 6/1934 Herrmann ............... F16C 19/26
384/573

(Continued)

FOREIGN PATENT DOCUMENTS

CN  101044333  9/2007
DE  4206861  9/1992
(Continued)

OTHER PUBLICATIONS

Translation of JPH0979270 obtained Aug. 1, 2017.*

*Primary Examiner* — James Pilkington
(74) *Attorney, Agent, or Firm* — Volpe and Koenig, P.C.

(57) ABSTRACT

A bearing cage for receiving rolling elements is disclosed. In addition to two rings, the bearing cage also has a plurality of webs which run axially between the rings. In order to prevent the rolling elements from falling out of the pockets formed between the rings and the webs, the webs have a groove which runs in the direction of the respective web. When the rolling elements are inserted into the pockets, a tool engages into the groove and bends the edge region of the web in a direction of the rolling elements.

13 Claims, 3 Drawing Sheets

(51) Int. Cl.
*F16C 43/08* (2006.01)
*F16C 33/41* (2006.01)
*F16C 33/49* (2006.01)

(52) U.S. Cl.
CPC ........ *F16C 33/4617* (2013.01); *F16C 43/083* (2013.01); *F16C 33/494* (2013.01); *F16C 2220/40* (2013.01)

(56) References Cited

U.S. PATENT DOCUMENTS

| | | | |
|---|---|---|---|
| 3,295,899 A * | 1/1967 | Knowles | F16C 19/26 384/580 |
| 4,278,307 A | 7/1981 | Olschewski et al. | |
| 5,803,620 A | 9/1998 | Yokota | |
| 7,670,058 B2 | 3/2010 | Schorr et al. | |

FOREIGN PATENT DOCUMENTS

| | | |
|---|---|---|
| DE | 10021089 | 2/2001 |
| DE | 102004026291 | 12/2005 |
| EP | 0000372 | 7/1978 |
| EP | 0347630 | 12/1989 |
| GB | 1562140 | 3/1980 |
| JP | H0552348 | 3/1993 |
| JP | H0979270 | 3/1997 |
| JP | H11280769 | 10/1999 |

* cited by examiner

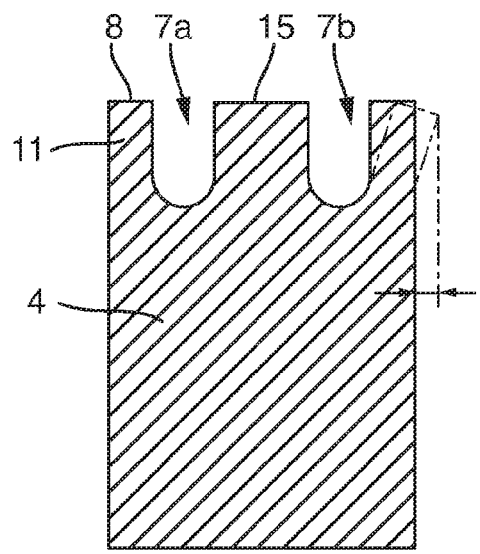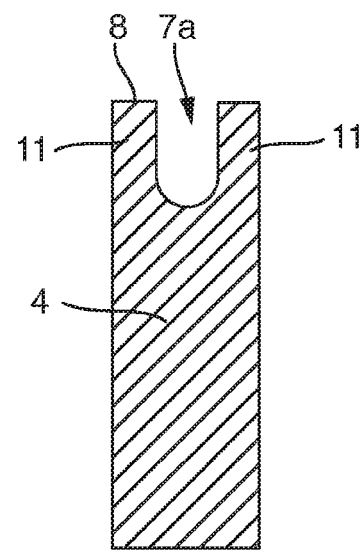
Fig. 3     Fig. 4
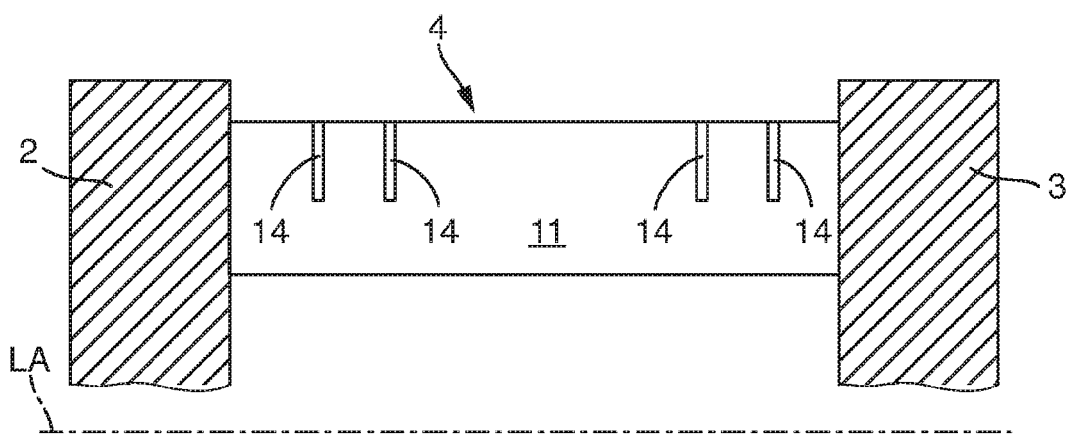
Fig. 5
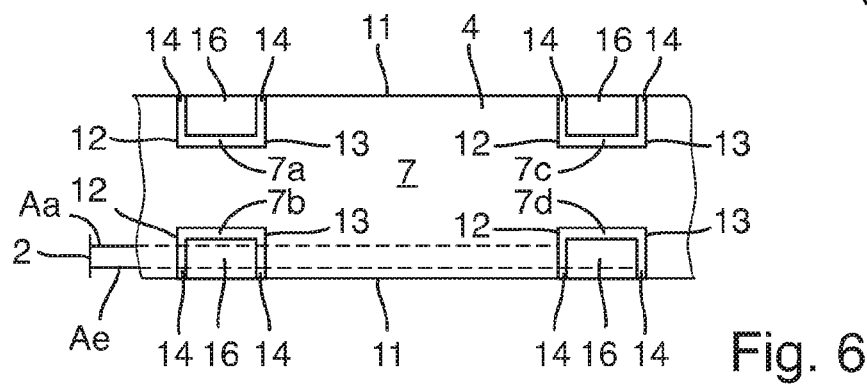
Fig. 6

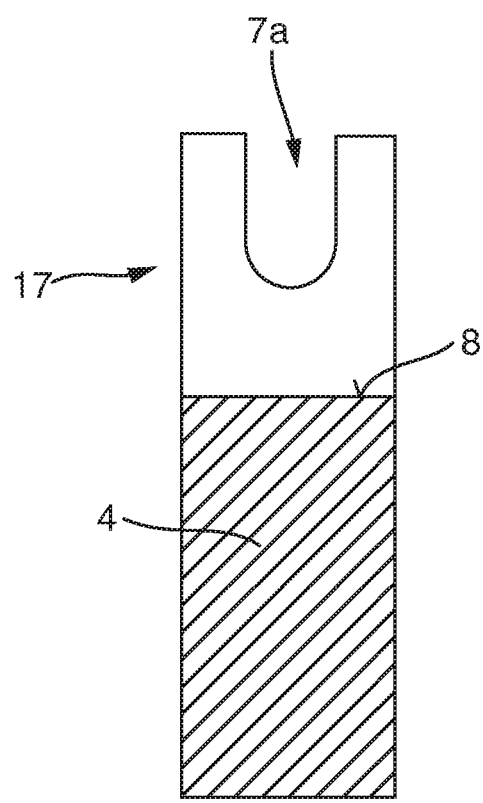

BEARING CAGE

BACKGROUND

The invention is concerned with the configuration of bearing cages, as are used for spacing apart, guiding and securing rolling bodies of anti-friction bearings.

A bearing cage of this type is known from DE102004026291. The bearing cage is formed substantially from two rings, which are arranged at an axial spacing from one another, and a plurality of webs, the webs extending in the axial direction and being connected to the two rings. Pockets which receive rolling bodies which are inserted into them are formed between the webs and rings in the connected state.

In order to prevent the rolling bodies which are inserted into the pockets from falling out of the pockets during transport or during assembly, at least one holding lug is provided on each of the webs which delimit a pocket, said holding lug protrudes in the direction of the center of each pocket and therefore reduces the free cross section of a pocket somewhat. If a rolling body is inserted into a pocket of this type, it is prevented that the inserted rolling bodies fall out radially. If a unit comprising outer bearing ring, cage and rolling bodies is to be provided, first of all the cage is inserted into the outer bearing ring. The rolling bodies are then pressed against the holding lugs radially from the inside until the latter yield and the respective rolling body snaps into the pocket. If an inner bearing ring is to be configured, in this case the cage is arranged around the inner bearing ring, and the rolling bodies are then snapped radially from the outside into the pockets counter to the action of the holding lugs. In order to permit the snapping of the rolling bodies into the cage pockets and in order to ensure secure holding of the rolling bodies in pockets, the dimensions of the holding lugs have to be adapted to the diameters of the rolling bodies to be inserted with considerable complexity, in order to ensure constantly elastic deflection. This may still be possible with acceptable complexity in the case of small rolling body diameters. Problems arise in the case of rolling bodies which have larger diameters and are therefore also heavier, since the holding lugs which still permit elastic deflection of the rolling bodies are frequently no longer capable of securing rolling bodies which are this heavy permanently in the pockets against falling out radially. This is critical, in particular, when the unit comprising bearing ring, cage and rolling bodies has to be moved, since even small vibrations can lead to the rolling bodies falling out of the pockets in view of the high rolling body weights.

SUMMARY

The invention is therefore based on the object of specifying a bearing cage which overcomes the disadvantages in the prior art.

This object is achieved by way of one or more of the features of the invention. Advantageous embodiments and developments of the invention can be gathered from the claims.

The invention is based on the concept of providing the web with at least one groove which is made in one of the two radial faces of said web and which extends in the axial direction along the direction of extent of the respective web between the two rings. It is essential in this context that the groove is configured on that radial side of the web, from which the rolling bodies are filled into the pockets. As can be seen readily, there are no holding lugs in this embodiment which, during filling of the rolling bodies into the pockets, protrude into the inside cross section of the pockets and against which the rolling bodies have to be pushed or pressed into their final position in the pockets. This ensures that the tolerance maintenance between the holding lug and the rolling body diameters which is otherwise significant in the case of the snap action function of the holding lugs is insignificant according to the invention. Rather, the rolling bodies can be placed into pockets of the bearing cage according to the invention without being impeded by components of said bearing cage. Rather, the rolling bodies which are inserted into the pockets are secured according to the invention by virtue of the fact that the width of the groove is widened in the circumferential direction. This widening of the groove causes the edge regions of the webs to be deformed plastically in the direction of the rolling bodies which are inserted into the pockets and therefore to block the path of the rolling bodies for the rolling bodies to fall out radially counter to the filling direction.

If the respective radial side of the webs is provided with second grooves which run parallel to one another, the force which is required for the deformation of the edge regions can be reduced. Moreover, the rib which is bounded by the two grooves which run in parallel can be used to limit the introduction depth of a tool which engages into the grooves and widens them.

There is particularly satisfactory process control when each groove has an axial end and an axial start, each end and each start being provided with a slot which continues the groove into an edge region of the web. By virtue of the fact that the ends and starts of the grooves are released by slots which are guided as far as into the edge region, lobes are formed in the edge region which can be deformed plastically particularly easily and without a great exertion of force.

If, in the case of two grooves which run parallel to one another, their respective ends are at the same axial spacing from one of the rings and their respective starts are likewise at the same spacing from said ring or the other ring, the lobes of the edge region which are released in this way can be deformed plastically at the same time and very simply for both web sides by way of one tool.

There is particularly satisfactory securing of the rolling bodies in the pockets against falling out radially when each edge region of the respective web has at least two grooves which are aligned in the axial direction, each end and each start of said axially aligned grooves being provided with a slot which continues the respective groove into the edge region of the web.

If each web 4 is provided on one of its radial faces 8 with projections which extend in the radial direction and are connected in one piece to the web 4, and if the grooves 7*a*, 7*b*, 7*c*, 7*d* traverse exclusively the projections, the web 4 which guides the rolling bodies 6 is not weakened by way of the fastening according to the invention of the rolling bodies 6 in the pockets 5.

BRIEF DESCRIPTION OF THE DRAWINGS

In the drawings:

FIG. 3 shows a section through a web of a cage,

FIG. 4 shows a section through another embodiment of a web of a cage,

FIG. 5 shows a view of an edge region of a web of a cage,

FIG. 6 shows a plan view of a web according to FIG. 5, and

FIG. 7 shows a further embodiment of a web according to FIG. 4.

DETAILED DESCRIPTION OF THE PREFERRED EMBODIMENTS

The invention is now to be explained in greater detail using the figures.

Figure 1:
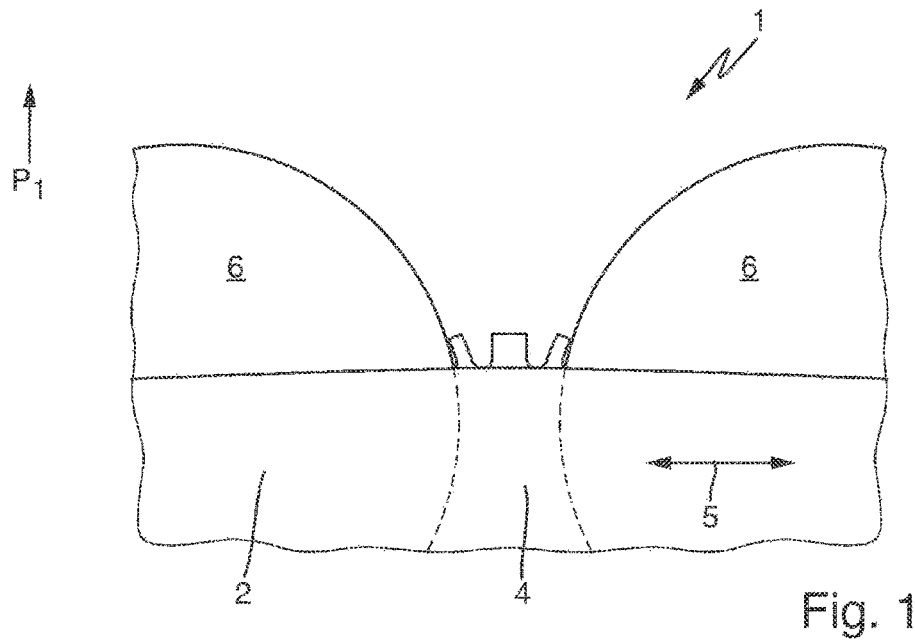
FIG. 1 shows part of a bearing cage in a side view (diagrammatically)

The bearing cage 1 which is shown in detail in FIG. 1 is formed by a first ring 2 and a second ring 3, the second ring 3 which is arranged at an axial spacing from the first ring 2 in the viewing direction of FIG. 1 being concealed by the first ring 2 and therefore not being visible. Webs 4 are arranged between the two rings 2, 3, which webs 4 extend axially between the two rings 2, 3 and connect the rings 2, 3 to one another. Pockets 5, into which rolling bodies 6 are inserted, are formed between in each case two webs 4 and the two rings.

In order to permit easy insertion of the rolling bodies 6 counter to the arrow direction P1 according to FIG. 1, the web 4 is configured in accordance with FIG. 3 before the insertion of the rolling bodies 6 and has two grooves 7a, 7b which enclose a rib 15 between themselves, are made in the radial face 8 of the web 4, and the longitudinal extent of which follows that of the webs 4 between the rings 2, 3. As shown in, e.g., FIG. 3, the rib 15 and the lugs (at the radial face 8 in each edge region 11) extend a substantially equal height above the grooves 7a, 7b.

Figure 2:
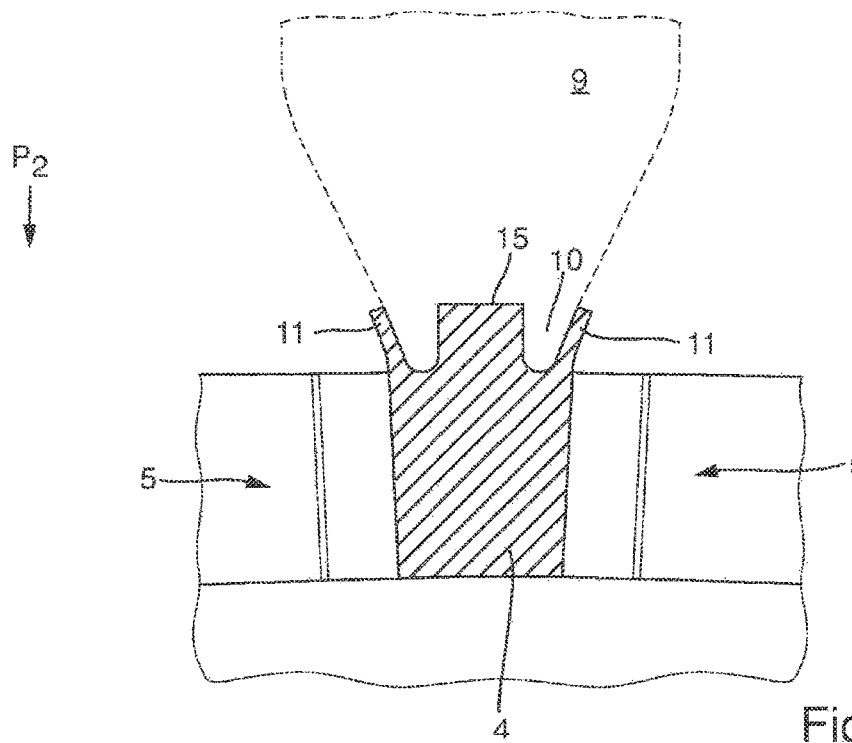
FIG. 2 shows a section through a bearing cage according to FIG. 1.

If the two rolling bodies 6 are now inserted into the pockets 5, as shown in FIG. 1, a tool 9 is inserted into grooves 7a, 7b, as shown in FIG. 2, and is moved downward in the arrow direction P2. Since the tool ends 10 are of wedge-shaped configuration and are of wider configuration at their upper ends in comparison with the width of the grooves 7a, 7b, the movement of the tool 9 in the arrow direction P2 causes the edge regions 11 to bend transversely with respect to the arrow direction P2. This bending of the edge regions 11 is also indicated in FIG. 3 by way of the dashed lines for a right-hand (in the viewing direction of said figure) edge region 11 of the web 4. If the pockets 5 are filled with rolling bodies 6, as shown in FIG. 1, at the time at which the movement of the tool 9 takes place in the arrow direction P2, the bending or caulking of the edge regions 11 of the webs 4 causes the bent edge regions 11 to protrude into the inside cross section of the pockets 5 and the rolling bodies 6 which are in the pockets 5 to no longer be able to fall out of the pockets 5 in the arrow direction P1 according to FIG. 1 and to be secured in the pockets 5.

FIG. 4 shows a web 4 which, in comparison with a web 4 of the embodiment according to FIG. 3, has only one groove 7a in the radial face 8.

FIG. 5 shows a view into a bearing cage 1. In addition to the two rings 2, 3, said illustration also shows that the web 4 connects the two rings 2, 3 and extends substantially parallel to the indicated bearing axis LA. As can be gathered from the associated FIG. 6 which shows a plan view of a web 4 and its radial face 8, in each case two aligned grooves 7a, 7c and 7b, 7d which are arranged behind one another in the axial direction are provided on each edge region 11 of the web 4. Each of said two grooves 7a, 7c and 7b, 7d which are arranged behind one another in the axial direction is provided with a start 12 and an end 13, each groove 7a, 7b, 7c, 7d being continued at its respective start 12 and at its respective end 13 as far as into the edge region 11 of the web 4 by a slot 14 which is guided substantially at a right angle.

In this manner, the four grooves 7a, 7b, 7c, 7d are arranged as opposed pairs with a rib between each opposed pair.

It can also be gathered from FIG. 6 that the respective starts 12 of the groove pairs 7a, 7b and 7c, 7d are in each case at the same spacing Aa from one of the two rings (here, the ring 2). The same also applies to the respective ends 13 of the groove pairs 7a, 7b and 7c, 7d which maintain a spacing Ae from the ring 2. If, as shown in FIG. 6, the groove pairs 7a, 7b and 7c, 7d including their associated slots 14 are arranged symmetrically in the web 4, the edge regions 11 which lie between the respective starts 12 and ends 13 and basically form brackets 16 as a result of the clearances can be bent particularly simply by way of a common tool 9 and can bear against the rolling bodies 6 which are inserted into the pockets 5, as shown in FIG. 2.

If the web 4 is not to be weakened as a result of the fastening according to the invention of the rolling bodies 6 by the grooves 7a to 7d themselves, a web 4 which fulfills this object is shown in section according to FIG. 7. Said web 4 is provided at one of its two radial faces 8 (here, the outwardly directed radial face) with a projection 17 which is connected in one piece to the web 4, extends radially to the outside and receives exclusively the grooves (here, the groove 7a) which serve to fasten the rolling bodies 6 in the pockets 5.

LIST OF ELEMENT NAMES

1 Bearing cage
2 First ring
3 Second ring
4 Webs
5 Pockets
6 Rolling bodies
7a,b,c,d Grooves
8 Radial face
9 Tool
10 Tool ends
11 Edge regions
12 Start
13 End
14 Slot
15 Rib
16 Brackets
17 Projection

The invention claimed is:

1. A bearing cage, comprising
a first ring and a second ring,
webs that extend in an axial direction to connect the first and second rings and form pockets therebetween for receiving bearing elements, and
plastically deformable holding lugs formed on the webs, wherein at least one of the webs includes radial faces and one of the radial faces has at least two grooves which extend in the axial direction to permit plastic deformation of the holding lugs after insertion of a bearing element and enclose a single rib therebetween, and
wherein the rib and the lugs extend a substantially equal height above the grooves.

2. The bearing cage as claimed in claim 1, wherein each of the grooves has an axial end and an axial start, each said axial end and each said axial start being provided with a slot which continues the groove into an edge region of the web.

3. The bearing cage as claimed in claim 2, wherein the two grooves run parallel to one another, and the respective axial ends thereof are at a same axial spacing Ae from one of the rings, respectively, and the respective axial starts thereof are at a same spacing Aa from said ring or the other ring.

4. The bearing cage as claimed in claim 1, wherein the at least two grooves comprise four grooves, wherein each of the grooves has an axial end and an axial start, each said axial end and each said axial start being provided with a slot which continues the groove into one of two edge regions of the web, and wherein the four grooves are arranged as opposed pairs with a single rib between each opposed pair, each said edge region of the respective web is adjacent to at least two of the four grooves which are aligned in the axial direction.

5. The bearing cage as claimed in claim 1, wherein each said web is provided on one of said radial faces with projections which extend in a radial direction and are connected in one piece to the web, and the grooves traverse exclusively the projections.

6. The bearing cage as claimed in claim 1, wherein the grooves widen to cause the plastic deformation of the holding lugs.

7. A method for securing a bearing element in a bearing cage as claimed in claim 1, comprising inserting a bearing element into a pocket, and bending an edge region which is released from the remaining web by way of at least one of the respective groove or a slot of the respective groove against the inserted bearing element.

8. A method for securing a bearing element in a bearing cage as claimed in claim 1, comprising inserting the bearing element into a pocket,
inserting a wedge-shaped tool end of a tool into at least one groove of the two grooves; and
bending an edge region which is released from the remaining web by way of at least one of the respective groove or a slot of the respective groove against the inserted bearing element.

9. The method of claim 8, wherein the wedge-shaped tool end is a pair of wedge-shaped tool ends, and the step of inserting a wedge-shaped tool end is performed simultaneously in the two grooves of a respective web.

10. The method of claim 8, wherein the step of inserting a wedge-shaped tool end is performed on a single web.

11. In combination, a bearing cage and a tool, comprising:
the bearing cage as claimed in claim 1; and
a tool including tool ends that have a height substantially equal to the height of the lugs and the tool ends are wedge-shaped with upper ends wider than the grooves for bending the lugs circumferentially, wherein the tool simultaneously engages the lugs and the rib of one of the webs to bend the lugs.

12. A bearing cage, comprising
a first ring and a second ring,
webs that extend in an axial direction connect the first and second rings and form pockets therebetween for receiving bearing elements, and
a projection connected to an outer radial end of each said web, the projection having plastically deformable holding lugs,
wherein the projection includes a radial face and the radial face has a single groove which extends in the axial direction, the single groove widens to cause plastic deformation of the holding lugs after insertion of a bearing element, and
wherein the groove has a U-shaped cross-section that is open in a radially outward direction of the first and second rings, and is formed exclusively in the projection such that the webs are not weakened as a result of deformation of the lugs.

13. A bearing cage, comprising
a first ring and a second ring,
webs that extend in an axial direction connect the first and second rings and form pockets therebetween for receiving bearing elements, and
plastically deformable holding lugs formed on the webs,
wherein at least one of the webs includes radial faces and one of the radial faces has four grooves which extend in the axial direction to permit plastic deformation of the holding lugs after insertion of a bearing element,
wherein each of the grooves has an axial end and an axial start, each said axial end and each said axial start being provided with a slot which continues the groove into one of two edge regions of the web, and
wherein the four grooves are arranged as opposed pairs with a rib between each opposed pair, each said edge region of the respective web is adjacent to at least two of the grooves which are aligned in the axial direction.

* * * * *